United States Patent
Ogden et al.

(10) Patent No.: US 12,293,674 B2
(45) Date of Patent: May 6, 2025

(54) FLIGHT PLANNING THROUGH DATA DRIVEN CHARTING

(71) Applicant: Rockwell Collins, Inc., Cedar Rapids, IA (US)

(72) Inventors: Collin D Ogden, Marion, IA (US); Ellen L. McGaughy, Cedar Rapids, IA (US); Michael J. Krenz, Roscoe, IL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 185 days.

(21) Appl. No.: 18/094,619

(22) Filed: Jan. 9, 2023

(65) Prior Publication Data
US 2024/0233557 A1    Jul. 11, 2024

(51) Int. Cl.
| | |
|---|---|
| *G08G 5/34* | (2025.01) |
| *G06T 19/00* | (2011.01) |
| *G08G 5/21* | (2025.01) |
| *G08G 5/54* | (2025.01) |
| *G08G 5/76* | (2025.01) |

(52) U.S. Cl.
CPC ............. *G08G 5/34* (2025.01); *G06T 19/006* (2013.01); *G08G 5/21* (2025.01); *G08G 5/54* (2025.01); *G08G 5/76* (2025.01)

(58) Field of Classification Search
CPC .. G08G 5/0039; G08G 5/0021; G08G 5/0091; G08G 5/025; G06T 19/006
USPC .......................................................... 701/3
See application file for complete search history.

(56) References Cited

U.S. PATENT DOCUMENTS

| | | |
|---|---|---|
| 953,635 A | 3/1910 | Muth et al. |
| 7,342,514 B1 | 3/2008 | Bailey et al. |
| 7,693,621 B1 | 4/2010 | Chamas |
| 8,200,378 B1 | 6/2012 | Chiew et al. |
| 8,565,944 B1 | 10/2013 | Gershzohn |
| 8,849,476 B2 | 9/2014 | Coulmeau |
| 9,043,043 B1 | 5/2015 | Gribble et al. |
| 2007/0078591 A1 | 4/2007 | Meunier et al. |

(Continued)

FOREIGN PATENT DOCUMENTS

| | | |
|---|---|---|
| EP | 1963888 A2 | 9/2008 |
| EP | 2317488 A2 | 5/2011 |

(Continued)

OTHER PUBLICATIONS

Extended European Search Report dated Apr. 22, 2024; European Application No. 24151029.6.

*Primary Examiner* — Yazan A Soofi
(74) *Attorney, Agent, or Firm* — Suiter Swantz IP

(57) ABSTRACT

A system and method are provided for selecting features from a digital chart, and entering corresponding flight plan amendments into a flight plan by direct transfer to an FMS. Based on the selection, the system may prompt the user for subsequent selections. Digital charts are generated in dynamically or in real-time according to a set of databases, including the databased used by the FMS. Elements within the databases are characterized so that the flight crew can select which elements are displayed. Features in the digital chart may be made selectable or unselectable based on a filtering process. The filtering process may be based on environmental variables, aircraft capabilities, safety tolerances, etc.

20 Claims, 3 Drawing Sheets

(56) References Cited

U.S. PATENT DOCUMENTS

| | | | |
|---|---|---|---|
| 2007/0241936 A1* | 10/2007 | Arthur | G08G 5/0021 359/13 |
| 2007/0299598 A1 | 12/2007 | Fetzmann et al. | |
| 2010/0036552 A1* | 2/2010 | Pepitone | G08G 5/025 701/16 |
| 2013/0103297 A1* | 4/2013 | Bilek | G08G 5/065 701/120 |
| 2013/0271300 A1 | 10/2013 | Pepitone et al. | |
| 2014/0018979 A1* | 1/2014 | Goossen | G05D 1/0016 701/3 |
| 2015/0120098 A1* | 4/2015 | Catalfamo | G08G 5/0021 701/16 |
| 2016/0140854 A1* | 5/2016 | Enns | G08G 5/0013 701/16 |
| 2017/0323570 A1* | 11/2017 | Myren | G05D 1/106 |

FOREIGN PATENT DOCUMENTS

| | | |
|---|---|---|
| EP | 2355071 A1 | 8/2011 |
| EP | 2657922 A2 | 10/2013 |
| EP | 2657923 A2 | 10/2013 |
| EP | 2800082 A2 | 11/2014 |
| EP | 2991274 A1 | 3/2016 |
| EP | 3242280 A2 | 11/2017 |
| EP | 3444791 A3 | 4/2019 |

* cited by examiner

FIG. 2 CONVERGING ILS RWY 13R

FLIGHT PLANNING THROUGH DATA DRIVEN CHARTING

BACKGROUND

Existing flight management systems (FMS) receive data from databases such as ARINC 424 aeronautical navigation database that defines different navigational aids, airports, approaches, procedures, etc. in a computer readable format. Such data is not graphical, and therefore not intended to aid the human crew.

Pilots have traditionally utilized separate charts with human readable representations of the same information. Such charts are becoming digitized, and some are not only pixel representations of the data, but object representations of data which is embedded in the digital chart: rather than just drawing stored lines representing a runway, the rendering device may identify embedded information in the electronic chart corresponding to features of the runway (or text boxes, communications frequencies, airspace representations, etc.), and what the rendered elements actually represent, such as flight segments and their course headings, various navigation radio frequencies, distance measurements to a given point, etc.

Existing FMS, while having access to similar data, does not interact with digital charts or utilize embedded data from digital charts. FMS utilizes a separate interface to provide flight plan options to the flight crew; the flight crew then determines the appropriate option with respect to charts and other avionics systems and makes selections within the FMS interface.

It would be advantageous to have a system that allows embedded data from digital charts to be directly used within an FMS interface to make amendments to a flight plan.

SUMMARY

In one aspect, embodiments of the inventive concepts disclosed herein are directed to a system and method of selecting representations from a digital chart, and entering corresponding flight plan amendments into a flight plan by direct transfer to an FMS. Based on the selection, the system may prompt the user for subsequent selections.

In a further aspect, digital charts are generated in dynamically or in real-time according to a set of databases, including the databased used by the FMS. Elements within the databases are characterized so that the flight crew can select which elements are displayed.

In a further aspect, representations in the digital chart may be made selectable or unselectable based on a filtering process. The filtering process may be based on environmental variables, aircraft capabilities, safety tolerances, etc.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 2 shows a digital chart according to an exemplary embodiment;

DETAILED DESCRIPTION

Figure 1:
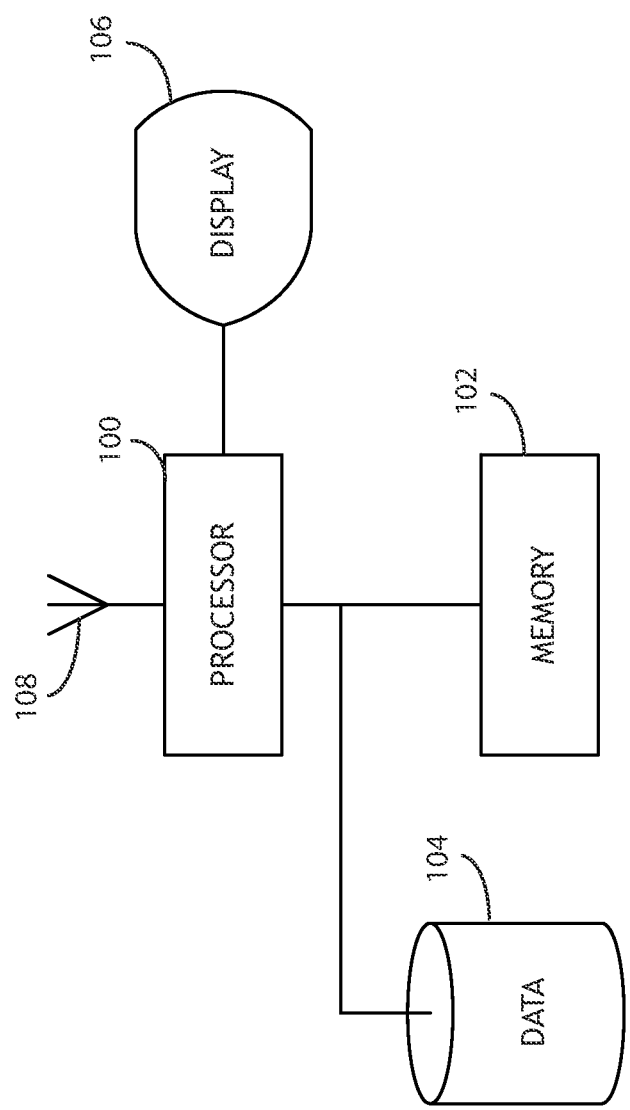
FIG. 1 shows a block diagram of a system suitable for implementing an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method of selecting representations from a digital chart, and entering corresponding flight plan amendments into a flight plan by direct transfer to an FMS. Based on the selection, the system may prompt the user for subsequent selections. Digital charts are generated in dynamically or in real-time according to a set of databases, including the databased used by the FMS. Elements within the databases are characterized so that the flight crew can select which elements are displayed. Representations in the digital chart may be made selectable or unselectable based on a filtering process. The filtering process may be based on environmental variables, aircraft capabilities, safety tolerances, etc.

Referring to FIG. 1, a block diagram of a system suitable for implementing an exemplary embodiment is shown. The system (which may be embodied in an FMS or configured to interact with an FMS) includes a processor 100, a memory 102 connected to the processor 100 for embodying processor executable code, a display 106 in data communication with the processor 100, and a data storage element 104 in data communication with the processor 100.

In at least one embodiment, the processor 100 retrieves a digital chart from the data storage element 104. The digital chart may comprise data corresponding to elements of the symbology represented on the digital chart. Alternatively, or in addition, the processor 100 may retrieve a digital chart and access a separate database of aeronautically significant features (i.e., the ARINC 424 database). The processor 100 may correlate the aeronautically significant features to corresponding representations on the digital chart.

The processor 100 may define selectable input regions for each representation on the digital chart and define sets of flight plan inputs based on the aeronautically significant features. A pilot or flight crew member may select a representation from the digital chart, and the processor 100 will retrieve the corresponding set of flight plan inputs and implement amendments to a current flight plan according to the flight plan inputs to incorporate the selected feature into the current flight plan. For example, a digital chart may include an approach to a runway. The digital chart may include embedded data pertaining to the approach (or the processor may access such data via a separate database) such as a runway, heading, and altitude. The processor 100 may then produce an amendment to a flight plan to execute the approach, and either incorporate the amendment or send it to an FMS to incorporate the amendment.

In at least one embodiment, the processor 100 may enable or disable the selectable regions based on certain criteria. For example, when producing the selectable regions, the processor 100 may compare the flight plan inputs with known capabilities of the aircraft. If the flight plan inputs are not within the capabilities of the aircraft, the selectable region may be disabled. In at least one embodiment, disabled selectable regions may be rendered in a visual distinct manner to indicate to the flight crew that the corresponding features are not useable. In at least one embodiment, the processor 100 may continuously monitor environmental criteria and enable or disable selectable representations in the digital chart.

Criteria for determining if selectable representations should be enabled or disabled may include environmental criteria (i.e., weather conditions such as ice, wind, storm cells, visibility, etc.), aircraft criteria (i.e., aircraft capabilities such as climb rate, runway size requirement, etc.), and circumstantial criteria (i.e., does a safe abort option exist, is the feature currently out of service, etc.). Furthermore, the processor 100 may determine which selectable representations should be enabled or disabled based on information in Notices to Airmen/Notices to Air Missions (NOTAM). NOTAMS may be used to filter out approaches that are not authorized due to published limitations.

In at least one embodiment, the processor 100 may define regions including notes or published information, and render such regions proximate to the corresponding feature on the digital chart. Such regions may be selectable to provide expanded information to the flight crew as necessary. In at least one embodiment, the processor 100 may filter which notes and published information is included based on mission parameters, such as if the aircraft will pass within a threshold distance of the feature.

Figure 2:
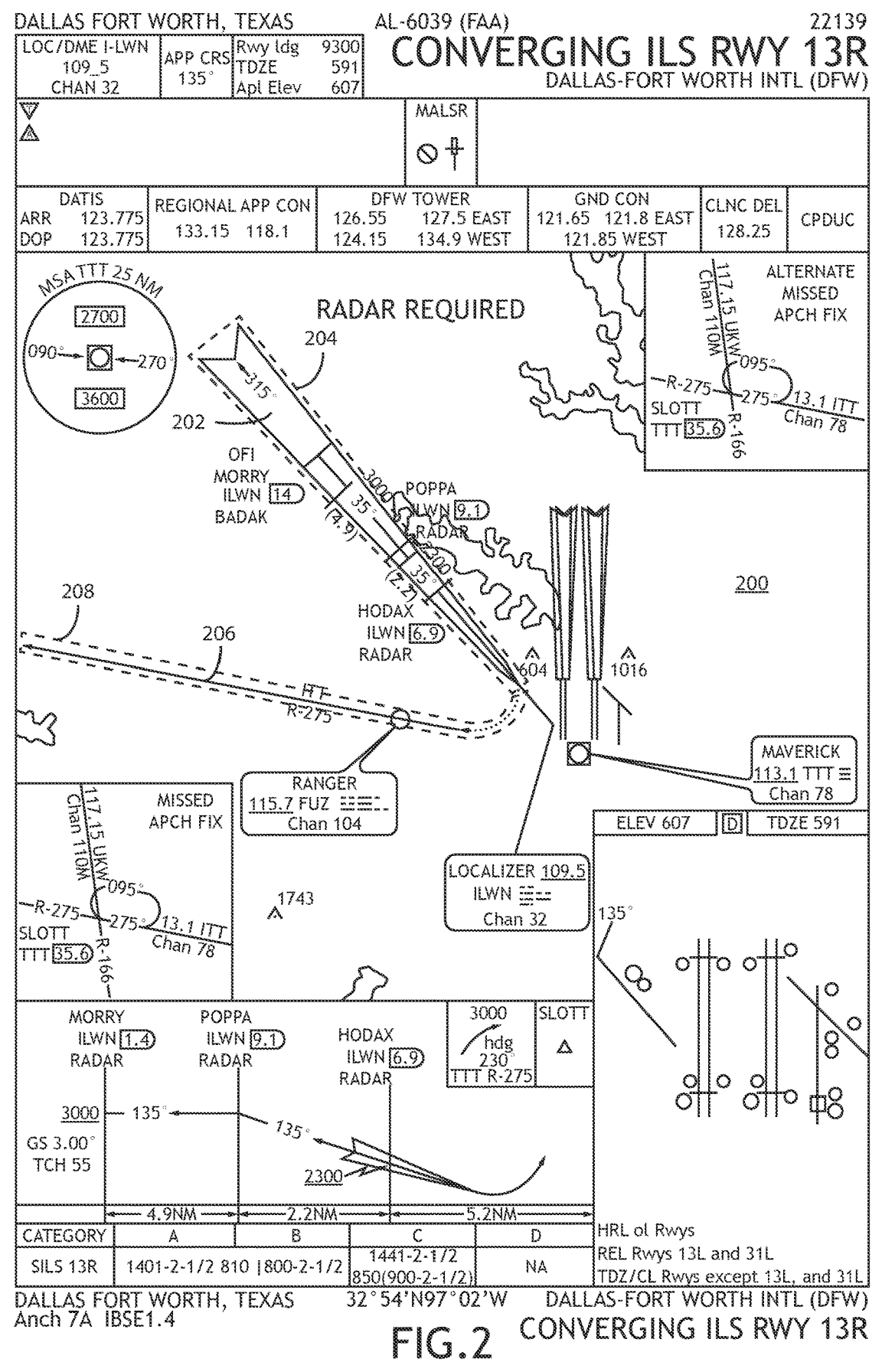

Referring to FIG. 2, a digital chart 200 according to an exemplary embodiment is shown. Digital charts 200 are approaching a state where they include all of the information in the ARINC 424 database. A digital chart 200 according to an exemplary embodiment includes representations 202, 206 of aeronautically significant structures, routes, etc. Each representation 202, 206 may be associated with data useful for producing a flight plan (i.e., directions, altitudes, airspace requirements, etc.) or operating in the area/along the route (i.e., local radio frequencies and the like).

In at least one embodiment, a system may use approach lighting system information, and render a display of such approach lighting system on the digital charts augment a virtual reality display (SVS, EVS, CVS). For example, the system may render an indicator of where to look to find the approach lights. Furthermore, the symbology may reflect the pattern of the lights. Light patterns may not be stored in existing digital charts; in those cases, light patterns may be retrieved and incorporated from separate data sources.

In at least one embodiment, a system applies selectable regions 204, 208, each corresponding to one of the representations 202, 206. When a selectable region 204, 208 is selected via a user interface, the data associated with the corresponding representation 202, 206 is used to produce an amendment to a flight plan. The amendment may then be applied to the current flight plan or transferred to an FMS to apply the amendment.

In at least one embodiment, the system may determine if any real features corresponding to the representations 202, 206 are unavailable and flag the corresponding selectable regions 204, 208 as disabled. Furthermore, the system may render the representations 202, 206 to indicate those features are unusable. Likewise, the system may analyze the data corresponding to each representation 202, 206 with respect to the capabilities of the aircraft. If the aircraft does not meet some necessary criteria of the feature (i.e., the aircraft cannot perform a required rate of climb for a runway), the corresponding selectable region 204, 208 is disabled and the representation 202, 206 rendered to indicate the feature is unusable. Also, the system may continuously monitor environmental conditions such as weather to determine if any feature is unavailable and disable or enable the selectable region 204, 208 accordingly.

In at least one embodiment, serial user selections of selectable regions 204, 208 may indicate a user desire to chain together several selections. Where multiple selections do not produce any inconsistencies or discontinuities, the system may recognize the selected chain and produce a corresponding flight plan amendment, or initial flight plan.

Figure 3:
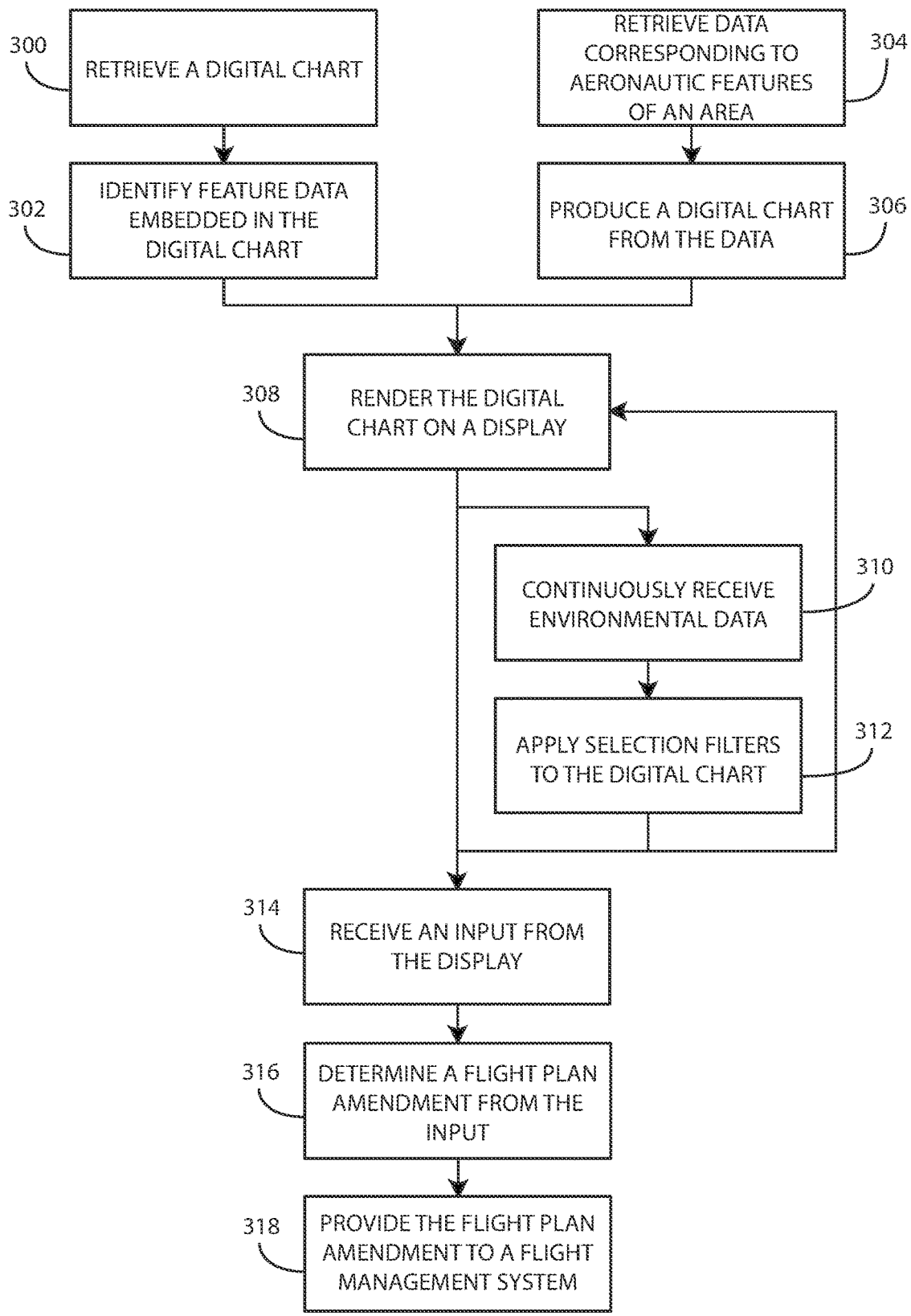
FIG. 3 shows a flowchart of a method according to an exemplary embodiment.

Referring to FIG. 3, a flowchart of a method according to an exemplary embodiment is shown. In at least one embodiment, a system (such as an FMS) retrieves 300 a digital chart and identifies 302 representations on the digital chart with embedded data corresponding to the real features represented. Alternatively, or in addition, the system retrieves 304 data corresponding to the real features from a separate database and produces 306 a digital chart or embeds the data in an existing digital chart. Furthermore, the system may retrieve dynamic data in real time and apply updates to the digital chart. For example, the system may render actual DME as compared to DME target, an actual track as compared to a desired track, actual altitude, etc. Such dynamic updates may be useful for situational awareness.

The system renders 308 the digital chart on a display including selectable regions corresponding to the representations. Each selectable region is associated with a set of flight plan inputs based on the data corresponding to the real features. For example, where an approach is represented on the digital chart, the approach may be associated with a direction and initial altitude.

When the system receives 314 an input from a user interface device corresponding to a selectable region, the system determines 316 a flight plan amendment. For example, selecting the selectable region corresponding to a represented approach would initiate a flight plan amendment to bring the aircraft in conformity with the associated direction and altitude. The system may then apply the flight plan amendment or provide 318 the flight plan amendment to a separate FMS.

In at least one embodiment, the system continuously receives 310 environmental data and applies 312 selection filters to the digital chart to disable or enable selectable regions. Such filters may comprise threshold criteria such as wind speed, distance to the nearest storm cell, minimum overcast level, or the like. Likewise, the system may apply 312 filters based on aircraft capabilities such as being unable to utilize certain navaids. Furthermore, the system may apply 312 filters based on circumstantial criteria such as certain represented features being physically unavailable or no safe abort procedure existing. It may be appreciated that categories are not exclusive and are presented for ease of understanding. For example, in some circumstances, an aircraft may have insufficient performance for a second segment climb in the event of a missed approach. In that case, the selectable region for that approach may be disabled.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
   a display device;
   a data storage element; and
   at least one processor in data communication with a memory storing processor executable code for configuring the at least one processor to:
   retrieve a digital chart from the data storage element;
   identify aeronautically significant features represented on the digital chart;
   identify data associated with the represented features;
   define selectable regions for each of the represented features;
   receive a user input to at least one of the selectable regions; and
   prepare a flight plan amendment based on the data associated with the user selected selectable region.

2. The computer apparatus of claim 1, wherein the at least one processor is further configured to:
   retrieve the data associated with the represented features from a database; and
   embed the data in the digital chart.

3. The computer apparatus of claim 1, wherein the at least one processor is further configured to:
   for each of the selectable regions, determine if the selectable region meets some threshold criteria; and
   disable the selectable region.

4. The computer apparatus of claim 3, wherein the at least one processor is further configured to render each represented feature associated with a disabled selectable region in a visually distinct manner.

5. The computer apparatus of claim 3, wherein:
   the threshold criteria comprise weather related criteria; and
   the at least one processor is further configured to:
   continuously receive weather related data; and
   continuously compare the received weather related data to the threshold criteria.

6. The computer apparatus of claim 3, wherein the threshold criteria comprise aircraft specific capabilities.

7. The computer apparatus of claim 3, wherein determining if the selectable region meets some threshold criteria comprises determining if the corresponding represented feature is currently available.

8. A method comprising:
   retrieving a digital chart;
   identifying aeronautically significant features represented on the digital chart;
   identifying data associated with the represented features;
   defining selectable regions for each of the represented features;
   receiving a user input to at least one of the selectable regions; and
   preparing a flight plan amendment based on the data associated with the user selected selectable region.

9. The method of claim 8, further comprising:
   retrieving the data associated with the represented features from a database; and
   embedding the data in the digital chart.

10. The method of claim 8, further comprising:
    for each of the selectable regions, determining if the selectable region meets some threshold criteria; and
    disabling the selectable region.

11. The method of claim 10, further comprising rendering each represented feature associated with a disabled selectable region in a visually distinct manner.

12. The method of claim 10, further comprising:
    retrieving data corresponding to an approach lighting system location from the digital chart; and
    rendering an indication of the approach lighting system location in an augmented reality system.

13. The method of claim 10, wherein the threshold criteria comprise aircraft specific capabilities.

14. The method of claim 10, wherein determining if the selectable region meets some threshold criteria comprises determining if the corresponding represented feature is currently available.

15. A flight management system comprising:

a display device;

a data storage element; and at least one processor in data communication with a memory storing processor executable code for configuring the at least one processor to:

retrieve a digital chart from the data storage element;

identify aeronautically significant features represented on the digital chart;

identify data associated with the represented features;

define selectable regions for each of the represented features;

receive a user input to at least one of the selectable regions; and prepare a flight plan amendment based on the data associated with the user selected selectable region.

16. The flight management system of claim 15, wherein the at least one processor is further configured to:

retrieve the data associated with the represented features from a database; and embed the data in the digital chart.

17. The flight management system of claim 15, wherein the at least one processor is further configured to:

for each of the selectable regions, determine if the selectable region meets some threshold criteria; and disable the selectable region.

18. The flight management system of claim 17, wherein the at least one processor is further configured to render each represented feature associated with a disabled selectable region in a visually distinct manner.

19. The flight management system of claim 17, wherein:

the threshold criteria comprise weather related criteria; and the at least one processor is further configured to:

continuously receive weather related data; and continuously compare the received weather related data to the threshold criteria.

20. The flight management system of claim 17, wherein the threshold criteria comprise aircraft specific capabilities.

* * * * *